United States Patent [19]

Müller

[11] Patent Number: 4,471,670
[45] Date of Patent: Sep. 18, 1984

[54] HYDRODYNAMIC REVERSING TRANSMISSION

[75] Inventor: Helmut Müller, Heidenheim, Fed. Rep. of Germany

[73] Assignee: J. M. Voith GmbH, Heidenheim, Fed. Rep. of Germany

[21] Appl. No.: 221,567

[22] Filed: Dec. 31, 1980

[30] Foreign Application Priority Data

Jan. 12, 1980 [DE] Fed. Rep. of Germany ....... 3000968

[51] Int. Cl.³ ...................... F16H 47/00; F16D 33/16
[52] U.S. Cl. ......................................... 74/731; 74/732; 74/718; 192/3.25
[58] Field of Search ................ 74/718, 720, 730, 731, 74/732, 733; 192/3.22, 3.24, 3.25, 3.34

[56] References Cited

U.S. PATENT DOCUMENTS

| | | | |
|---|---|---|---|
| 3,159,054 | 12/1964 | Gros | 74/732 |
| 3,159,055 | 12/1964 | Schweizer | 74/731 |
| 3,270,587 | 9/1966 | Geray | 74/718 |
| 3,491,618 | 1/1970 | Neuber | 74/718 |
| 3,491,619 | 1/1970 | Keller | 74/720 |
| 3,555,931 | 1/1971 | Polzer | 74/718 |
| 3,566,715 | 3/1971 | Keller et al. | 74/731 |
| 3,944,034 | 3/1976 | Ahlen | 74/730 |
| 3,948,367 | 4/1976 | Weinrich et al. | 74/733 |
| 4,077,502 | 3/1978 | Nitsche et al. | 74/733 |
| 4,099,426 | 7/1978 | Keller et al. | 74/718 |
| 4,184,330 | 1/1980 | Polzer et al. | 60/335 |

FOREIGN PATENT DOCUMENTS 1178101 5/1965 Fed. Rep. of Germany .
1550866 7/1969 Fed. Rep. of Germany ........ 74/718

Primary Examiner—Allan D. Herrmann
Assistant Examiner—Joseph M. Rolnicki
Attorney, Agent, or Firm—Peter K. Kontler

[57] ABSTRACT

A hydrodynamic reversing transmission with discrete first and second hydrodynamic starting torque converters in the forward and reverse drive trains and an additional torque converter which is installed in the forward drive train and is actuatable to transmit torque in the intermediate or higher speed range of the respective drive train has a clutch which is rendered operative simultaneously with the second torque converter to enhance the braking action while the vehicle which utilizes the transmission moves in the preferred forward direction. The clutch performs a dual function, namely, to assist the second torque converter in braking the vehicle, such as a dump truck, while the vehicle moves in the preferred direction, as well as to drive the output shaft of the transmission in the higher or highest speed range of the forward drive train. When the clutch assists in braking of the vehicle, it transmits torque from the wheels of the vehicle (i.e., from the output shaft of the transmission) to the input side of the transmission. The clutch may be installed in a discrete housing which is separably connected to the transmission case.

20 Claims, 5 Drawing Figures

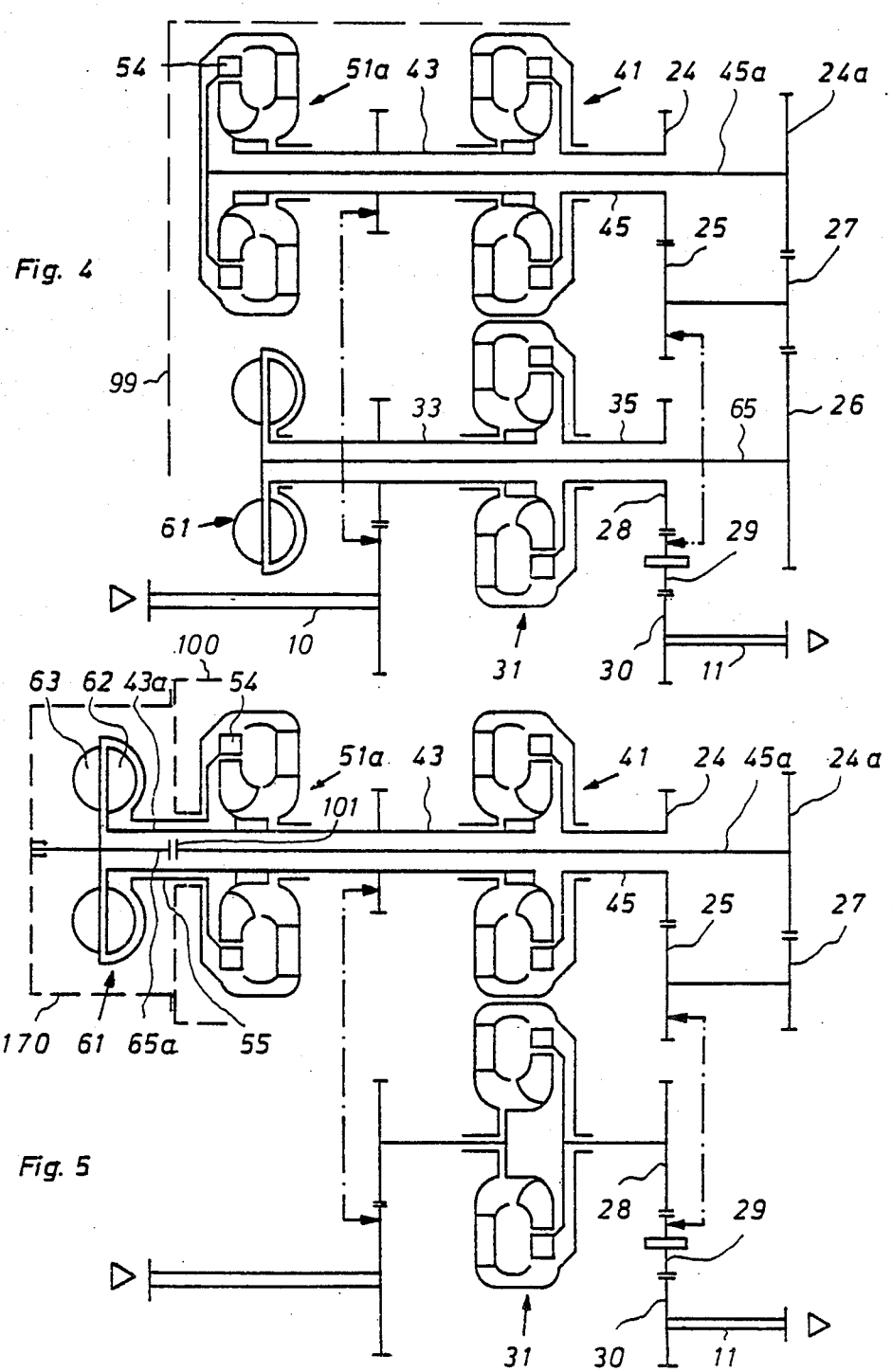

HYDRODYNAMIC REVERSING TRANSMISSION

BACKGROUND OF THE INVENTION

The present invention relates to hydrodynamic reversing transmissions for automotive vehicles, especially for heavy duty dump trucks and analogous conveyances. More particularly, the invention relates to improvements in hydrodynamic reversing transmissions of the type disclosed in German Pat. No. 1,178,101 (note particularly FIGS. 1 and 2 of this patent). Attention is further invited to commonly owned U.S. Pat. No. 4,099,426 granted July 11, 1978 to Keller et al. whose disclosure is incorporated herein by reference.

German Pat. No. 1,178,101 discloses a transmission which is designed for use in rail-mounted vehicles, particularly in locomotives for passenger or freight trains as well as in locomotives for shunting or switching service in marshalling yards. The patented transmission comprises a hydrodynamic torque converter in the forward drive train and a hydrodynamic torque converter in the reverse drive train. As a rule, the two torque converters are used alternately, i.e., one is permitted to receive pressurized working fluid while the working fluid is allowed to escape from the chamber of the other torque converter and vice versa. It is also possible to operate in the so-called counterbraking range in which the turbine of one of the torque converters operates in the negative direction, i.e., to allow one of the torque converters to receive pressurized fluid while the other torque converter is drained. Each such torque converter constitutes a starting torque converter, i.e., they are used for operation in the lower speed range. For traction operation in the higher speed range, the transmission of the German patent comprises a clutch, preferably a hydrodynamic clutch.

When the transmission of the German patent is installed in a locomotive for use in a marshalling yard, the vehicle is caused to change the direction of its movement by evacuating one of the starting torque converters and by admitting working fluid to the chamber of the other torque converter. When the locomotive which embodies such transmission is used for long-distance service to pull passenger or freight trains, the locomotive is equipped with an additional mechanical reversing transmission which is used to change the direction of travel of the locomotove and renders it possible to use the clutch during travel in either direction. A drawback of such conventional transmissions is that, for hydrodynamic braking with one of the two torque converters in the counterbraking range, the energy consumption of the pump wheel in the torque converter is relatively high. In other words, the torque converter which is used to furnish a braking action consumes energy which is furnished by the engine at the time when such torque converter serves to brake the vehicle. However, the just mentioned drawback is not overly serious in conventional transmissions because hydrodynamic braking is resorted to only in the course of the shunting or switching service, i.e., the duration of braking operation is short or very short.

The situation is different when a hydrodynamic reversing transmission of the above outlined character is used to furnish longer-lasting braking actions, for example, when a vehicle is driven on a downwardly sloping road. Such situation does not arise often in connection with rail-mounted vehicles but is much more likely to be encountered with road vehicles, especially heavy duty vehicles of the class including dump trucks or the like. As a rule, such vehicles cover long distances without ever moving in reverse, i.e., the preferred direction of travel of such vehicles is the forward direction. Therefore, it is not necessary to provide a separate or additional mechanical reversing transmission in or for such types of vehicles. It suffices to provide the transmission which is used therein with means (e.g., a torque converter) for effecting a relatively slow movement in the rearward direction. The clutch is used only when the vehicle travels in the preferred (forward) direction and while the vehicle is driven at a relatively high speed.

OBJECTS AND SUMMARY OF THE INVENTION

An object of the invention is to provide a novel and improved hydrodynamic reversing transmission with a braking device which includes a hydrodynamic torque converter and to construct the transmission in such a way that the energy requirements of the transmission during hydrodynamic braking are negligible or minimal.

Another object of the invention is to provide a transmission of the above outlined character wherein the required power output of the engine or another prime mover which drives the input element of the transmission in the course of a hydrodynamic braking operation is much lower than in heretofore known transmissions.

A further object of the invention is to provide a novel and improved control system for the clutch and torque converters of the above outlined reversing transmission.

Another object of the invention is to provide a vehicle, especially a heavy-duty vehicle, which embodies the improved transmission.

An additional object of the invention is to provide the transmission with novel and improved means for driving the output element at elevated speeds.

Another object of the invention is to provide the transmission with novel and improved means for confining the clutch which is used while the output element of the transmission is driven at an elevated speed.

Still another object of the invention is to provide the transmission with novel and improved means for selecting any one of several, or an infinite number of, forward speeds during travel of the conveyance which embodies the transmission in the preferred direction.

A further object of the invention is to provide the transmission with novel and improved means for applying braking torque to the output shaft, especially in the course of longer-lasting braking operation.

The invention resides in the provision of a hydrodynamic reversing transmission, particularly for use in heavy-duty road vehicles, such as dump trucks. The transmission comprises forward and reverse drive trains which respectively include first and second hydrodynamic torque converters (each of which is preferably a starting torque converter) actuatable alternately to respectively transmit torque in the lower speed ranges of the respective drive trains, clutch means (preferably a hydrodynamic clutch having coaxial rotary primary and secondary portions) installed in one of the drive trains and being operable to transmit torque in the upper speed range of the respective drive train, and braking means including means for rendering the clutch means operative simultaneously with actuation of the torque converter in the reverse drive train. The torque converters are preferably further actuatable in the so-called counterbraking range, and the one drive train (of the clutch means) is preferably the forward drive train.

Furthermore, the known advantage is exploited that the gearing operates with very good efficiency in the upper speed range of the preferred direction of travel (i.e, when the coupling is engaged), without any notable windage losses in reverse travel when the coupling halves rotate in opposite directions, because the attainable speed and time quota in reverse travel are low.

In accordance with a presently preferred embodiment, the braking means further comprises means (e.g., an adjustable flow restrictor in the filling conduit which admits pressurized working fluid to the chamber of the clutch means if the latter comprises or constitutes a hydrodynamic clutch) for varying the speed ratio between the primary and secondary portions of the clutch means.

One of the drive trains (preferably the forward drive train) may further comprise an additional hydrodynamic torque converter which is actuatable to transmit torque in the intermediate speed range of the respective drive train. This additional torque converter may constitute a cruising torque converter or a starting torque converter.

In one embodiment of the improved transmission, the additional torque converter is coaxial with the first torque converter and the clutch means is coaxial with the second torque converter. In a modified transmission, the clutch means is coaxial with the first and additional torque converters and the additional torque converter is installed between the first torque converter and the clutch means. In such transmission, the transmission case may accommodate the three torque converters and the clutch means is coaxial with the first and additional torque converters but is installed in a discrete housing which is separably coupled to the transmission case. The clutch means and the additional torque converter then preferably comprise coaxial shafts and the transmission further comprises means for separably coupling the coaxial shafts of the additional torque converter and the clutch means to each other.

The novel features which are considered as characteristic of the invention are set forth in particular in the appended claims. The improved transmission itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 4 is a schematic sectional view of a portion of a second hydrodynamic reversing transmission wherein the speed ratio of the torque transmitting connection between the secondary shaft of one torque converter in the forward drive train is different from the speed ratio of the means which transmits torque from the other torque converter of the forward drive train to the output shaft; and FIG. 5 is a schematic sectional view of a portion of a third hydrodynamic reversing transmission wherein the clutch means is coaxial with the two torque converters in the forward drive train.

DESCRIPTION OF THE PREFERRED EMBODIMENTS

Figure 1:
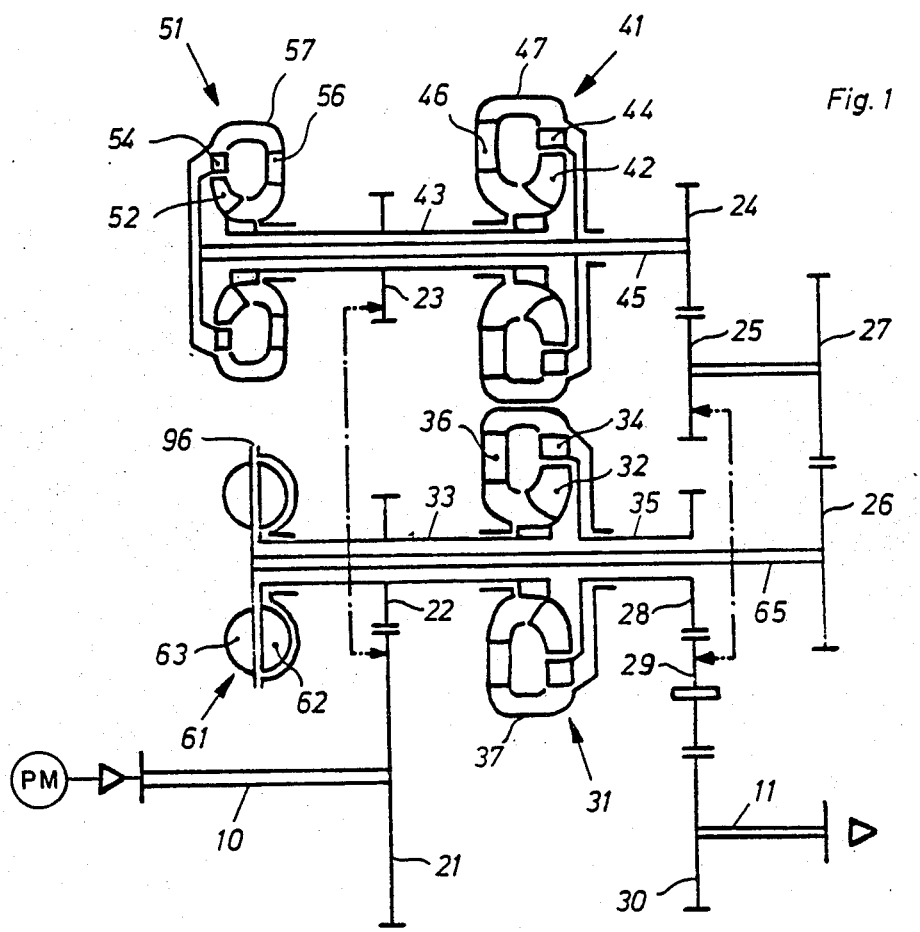
FIG. 1 is a schematic sectional view of a hydrodynamic reversing transmission which embodies one form of the invention, the section being taken in the direction of arrows as seen from the line I—I of FIG. 2.
Figure 2:
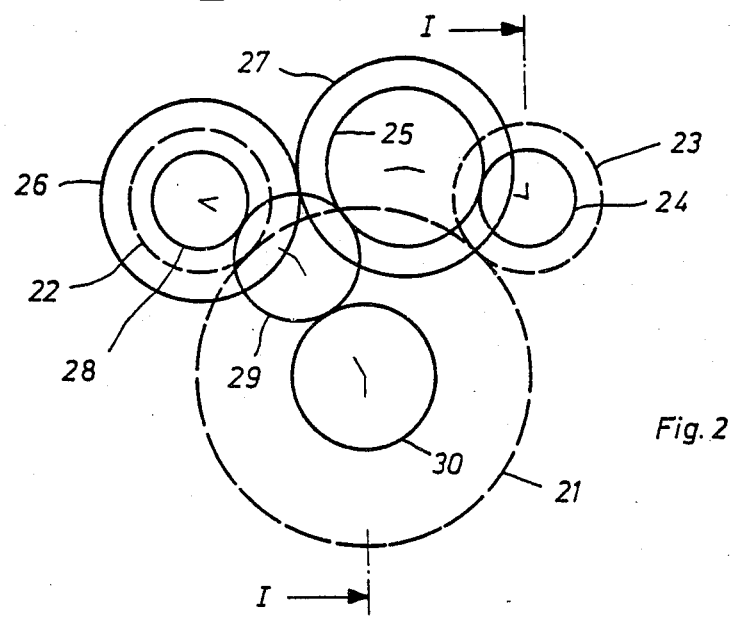
FIG. 2 is a schematic end elevational view of a gear train between the input shaft of the transmission and the primary shafts of the torque converters as well as of the gear trains between the secondary shafts of the torque converters and the output shaft of the transmission which is shown in FIG. 1.

Referring first to FIGS. 1 and 2, there is shown a hydrodynamic reversing transmission which comprises an input shaft or driving shaft 10 receiving motion from a suitable prime mover PM of any known design, for example, a diesel engine. The input shaft 10 drives a spur gear 21 which meshes with gears 22 and 23. The transmission further comprises two hydrodynamic starting torque converters 31 and 41 which are respectively installed in the reverse and forward drive trains. Thus, the torque converter 31 establishes reverse drive, and the torque converter 41 establishes forward drive. The torque converters 31 and 41 are immediately or very closely adjacent to each other, and their rotary components are rotatable about parallel axes. The torque converters 31 and 41 respectively comprise pump wheels 32 and 42 which are respectively connected to the aforementioned spur gears 22 and 23 by hollow primary shafts 33 and 43. The torque converters 31 and 41 further comprise turbine wheels 34 and 44. The turbine wheel 34 of the torque converter 31 is connected with a spur gear 28 through the medium of hollow secondary shaft 35. The turbine wheel 44 of the torque converter 41 is mounted on a centrally located secondary shaft 45 which is further connected with a gear 24. The secondary shaft 45 is coaxial with and extends through the interior of the hollow primary shaft 43. The reference characters 36 and 46 respectively denote annuli of stationary guide vanes of the torque converters 31 and 41. The stationary housings of the torque converters 31 and 41 are respectively shown at 37 and 47.

The gears 24 and 28 at the secondary sides of the starting torque converters 31 and 41 cooperate with two additional spur gears 25 and 29 to form therewith a four-gear train which ensures that the two secondary shafts 35 and 45 always rotate in opposite directions.

The torque converter 41 which establishes forward drive is coaxial with a cruising torque converter 51 which is also mounted in the forward drive train and comprises a pump wheel 52, a turbine wheel 54, an annulus of stationary guide vanes 56, and a fixed converter housing 57. The pump wheel 52 is secured to the hollow primary shaft 43 of the torque converter 41, and the turbine wheel 54 is connected to the central secondary shaft 45 of the torque converter 41. In other words, the shafts 43 and 45 are common to the torque converters 41 and 51.

The hydrodynamic starting torque converter 31 which establishes reverse drive is coaxial with a hydrodynamic clutch 61 which includes an annulus of primary blades 62 secured to the hollow primary shaft 33 of the torque converter 31. The secondary blades 63 of the clutch 61 are mounted on a discrete centrally located secondary shaft 65 which extends through the hollow primary and secondary shafts 33, 35 of the torque converter 31 and is connected to a spur gear 26. The gear 26 meshes with a spur gear 27 which is rigidly connected with the gear 25 by a shaft 27a.

The transmission of FIGS. 1 and 2 further comprises a rotary output shaft 11 which receives torque from a spur gear 30 meshing with the aforementioned spur gear 29. The shaft 11 transmits motion to the wheels of the vehicle.

The phantom lines 121 and 125 shown in FIG. 1 are intended to denote that the gear 21 meshes with the gear 23 as well as that the gear 25 meshes with the gear 29. This is more clearly shown in FIG. 2. For the sake of clarity, the gears 21, 22 and 23 of FIG. 2 are indicated by broken lines because they are disposed in a plane other than the planes of the gears 24, 25, 28, 29, 30 and 26, 27.

Figure 3:
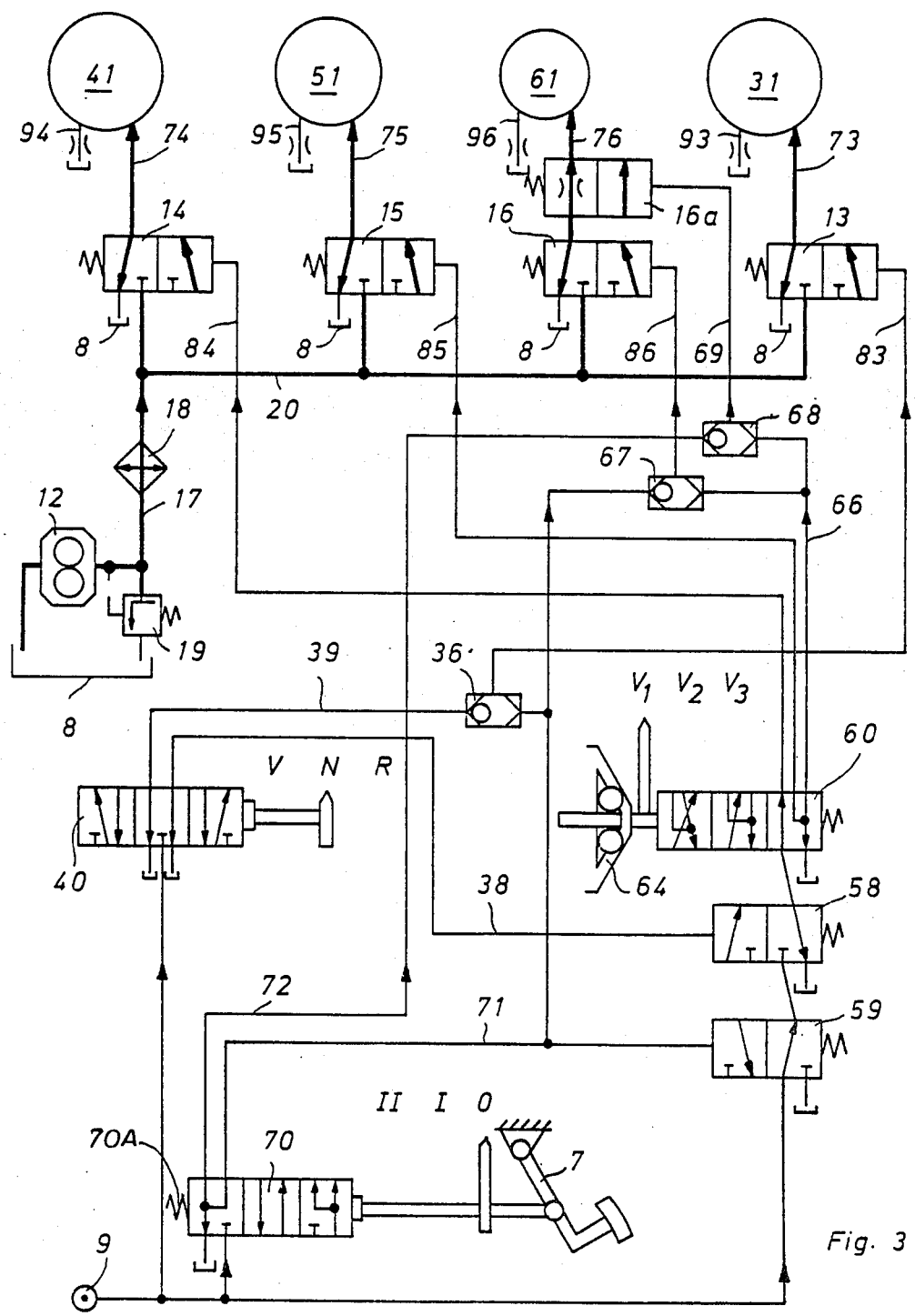
FIG. 3 is a diagrammatic view of the control system including the improved braking means which can render the clutch means operative simultaneously with one of the torque converters in the transmission of FIG. 1.

FIG. 3 illustrates the details of the control system for the hydrodynamic torque converters 31, 41, 51 and the hydrodynamic clutch 61. The torque converters 31, 41, 51 are symbolically shown by solid-line circles, the same as the clutch 61. The reversing transmission which includes the torque converters 31, 41 51 and the clutch 61 can drive the output shaft 11 at three forward speeds and a single reverse speed. Shifting into any one of the four speeds involves the admission of working fluid into the corresponding hydrodynamic unit 31, 41, 51 or 61. As a rule, only one of the units 31, 41, 51, 61 receives working fluid at a time; at such time, the chambers of the remaining three units are connected with a sump 8 in the case of the transmission.

The control system comprises a pump 12 which draws working fluid from the sump 8 and supplies pressurized working fluid (e.g., oil) to a pressure conduit 17 which contains a suitable cooling device 18. The cooled and pressurized fluid is delivered to a distributor conduit 20 which can supply pressurized working fluid to the torque converter 31, 41 or 51 and/or clutch 61. A relief valve 19 is connected between the outlet of the pump 12 and the sump 8 to determine the maximum permissible pressure in the conduits 17 and 20.

The reference characters 73, 74, 75 and 76 respectively denote the filling conduits for the torque converters 31, 41, 51 and clutch 61. These filling conduits respectively contain main or primary regulating valves 13, 14, 15 and 16. The valving elements of the regulating valves 13 through 16 are shiftable between two positions, namely, the illustrated first or idle positions and the second or operative positions, not specifically shown. Each such valving element may constitute a spool which is reciprocable between the two positions. FIG. 3 shows the valving elements of all four regulating valves 13 through 16 in the first or idle positions. Therefore, the filling conduits 73, 74, 75 and 76 are connected with the sump 8 by way of the respective regulating valves 13 through 16.

When a valving element, for example, the valving element of the regulating valve 13, is shifted to the second or operative position against the opposition of the respective valve spring 13A, the corresponding filling conduit (73) is connected to and receives pressurized working fluid from the distributor conduit 20.

The valving elements of the regulating valves 13 through 16 are movable to the corresponding operative positions in response to the application of hydraulic or pneumatic pressure against one of their end faces. This enables such valving elements to overcome the bias of the corresponding valve springs 13A, 14A, 15A and 16A. The compressed fluid (it is assumed that the fluid which is used to shift the valving elements of the regulating valves 13 through 16 to the corresponding operative positions is a gas, such as compressed air) is supplied by way of control lines 83 (for the valving element of the regulating valve 13), 84 (for the valving element of the regulating valve 14), 85 (for the valving element of the regulating valve 15) and 86 (for the valving element of the regulating valve 16).

The operator of the vehicle which embodies the improved hydrodynamic reversing transmission selects the direction of movement of the vehicle by actuating a selector valve 40. This valve has a handgrip portion 40A which is shiftable between the positions V (forward), N (neutral) and R (reverse). The handgrip portion 40A can shift the valving element of the selector valve 40 between three different positions. When the handgrip member 40A is shifted to the position V, the selector valve 40 allows compressed gaseous fluid to flow from a source 9 of compressed fluid (for example, a source of compressed air) into a control line 38 which can displace the valving element of a first auxiliary regulating valve 58 against the opposition of a valve spring 58A. When the handgrip member 40A is shifted to the position R, compressed fluid is free to flow from the source 9 through the selector valve 40 and into a control line 39 which is connected to one inlet of a twin check valve 36. When the handgrip member 40A is moved to the intermediate or neutral position N, the selector valve 40 seals the control lines 38 and 39 from the source 9 of compressed fluid.

As stated above, the control line 39 can supply compressed fluid to one inlet of the check valve 36 which has an outlet connected with the aforementioned control line 83 for the valving element of the main regulating valve 13 in the filling conduit 73 for the starting torque converter 31. Thus, when the control line 39 receives compressed fluid from the source 9, the valving element of the valve 13 immediately allows pressurized working fluid to flow from the distributor conduit 20 into the working chamber of and to fill the torque converter 31. Consequently, the torque converter 31 begins to transmit torque to the secondary shaft 35.

When the control line 38 is free to receive compressed fluid from the source 9 via selector valve 40, the auxiliary regulating valve 58 is caused to move its valving element from the illustrated position to the other end position against the opposition of the valve spring 58A. This enables compressed fluid to flow from the source 9 through a further or second auxiliary regulating valve 59, thereupon through the regulating valve 58 and through a forward speed selecting or changing valve 60 into the control line 84 for the valving element of the main regulating valve 14 in the filling conduit 74 for the starting torque converter 41. This enables the working fluid to fill the torque converter 41 and the latter begins to transmit torque to the secondary shaft 45 which drives the gear 24.

The forward speed selecting or changing valve 60 includes a valving element which is provided with an index 60B and is movable between three different positions V1, V2 and V3. The valving element of the valve 60 is movable automatically under the action of a centrifugal switch 64 which is driven by the output element of the engine PM serving to transmit motion to the input shaft 10. Consequently, the rotor of the centrifugal switch 64 is invariably driven at a speed which is proportional to the RPM of the engine PM. In the lower speed range of the engine, the index 60B of the valving element of the valve 60 assumes the position V1 in which the valve 60 allows compressed fluid to flow from the source 9, through the auxiliary regulating valves 58 and 59 (provided that the control line 38 receives compressed fluid via selector valve 40), forward speed changing valve 60 and to the main regulating valve 14 so that the valving element of the valve 14 is moved to the left-hand end position against the opposition of the valve spring 14A. In other words, when the valving element of the valve 60 assumes the position V1, the torque converter 41 receives working fluid from the pump 12 through the medium of the pressure conduit 17 and filling conduit 74.

When the RPM of the engine PM increases to one of a median range of rotational speeds, the centrifugal switch 64 automatically shifts the index 60B of the valving element of the forward speed selecting or changing valve 60 to the position V2 which results in sealing of the control line 84 from the source 9 of compressed fluid whereby the main regulating valve 14 connects the filling conduit 74 with the sump 8 so that the torque converter 41 ceases to drive the secondary shaft 45. At the same time, the forward speed selecting or changing valve 60 connects the source 9 with the pressure line 85 so that the valving element of the main regulating valve 15 is shifted against the opposition of the valve spring 15A and the filling conduit 75 receives pressurized working fluid from the pump 12 by way of the pressure conduit 17 and distributor conduit 20. Therefore, the cruising torque converter 51 begins to transmit torque to the secondary shaft 45 and spur gear 24.

When the RPM of the engine PM increases to a still higher value, the centrifugal switch 64 shifts the valving element of the forward speed selecting or changing valve 60 so that the index 60B assumes the position V3 whereby the valve 60 seals the control line 85 from the source 9 so that the filling conduit 75 of the cruising torque converter 51 is connected with the sump 8. At the same time, the valve 60 permits compressed fluid to flow into the control line 86 so that the valving element of the main regulating valve 16 is shifted against the opposition of the spring 16A and the hydrodynamic clutch 61 receives pressurized working fluid through the filling conduit 76 which is then connected with the distributor conduit 20. The flow of compressed fluid from the source 9 to the regulating valve 16 takes place through the valves 59, 58 and 60, a control line 66, a twin check valve 67 and the control line 86. At the same time, the control line 66 admits compressed fluid to the right-hand input of a further twin check valve 68 which is connected with a control line 69 leading to the right-hand side of a flow restrictor 16a. The flow restrictor 16a has a component which is movable to and from the illustrated position in which such component throttles the flow of pressurized fluid from the distributor conduit 20, through the main regulating valve 16 and into the chamber of the hydrodynamic clutch 61. When the aforementioned component of the flow restrictor 16a is shifted to the left-hand end position against the opposition of a spring 16AA, the flow restricting action of the device 16a is terminated so that the clutch 61 receives pressurized fluid at a higher rate. When the mobile component of the flow restrictor 16a assumes the illustrated normal or operative position, the flow restrictor 16a automatically throttles the flow of fluid through the filling conduit 76. However, and as mentioned before, when the control line 66 admits compressed fluid into the right-hand inlet of the twin-check valve 68, the movable component or the flow restrictor 16a is shifted in a direction to the left, as viewed in FIG. 3, so that the throttling action of the device 16a is terminated. Consequently, the working chamber of the clutch 61 is filled or practically filled whereby the slippage between the portions 62 and 63 of this clutch is reduced accordingly. This means that the secondary shaft 65 transmits torque to the gear 26 which, in turn, drives the output shaft 11 at a higher speed. Slippage between the portions 62 and 63 of the clutch 61 is much more pronounced when the movable component of the flow restrictor 16a assumes the position which is shown in FIG. 3.

The hydrodynamic braking action can be initiated as follows: As long as the vehicle is operated at a speed which is in the lower forward speed range (see the position V1 of the index 60B on the valving element of the forward speed selecting or changing valve 60 shown in FIG. 3), the operator of the vehicle need not be concerned with any other manipulations but those of the selector valve 40. In other words, if the operator wishes to reverse the direction of movement of the vehicle, the handgrip member 40A is shifted from the position V to the position R or vice versa. This results in evacuation of pressurized working fluid from the chamber of the torque converter 41 and in admission of pressurized fluid into the chamber of the torque converter 31 or vice versa. The draining of the torque converter 41 can take place simultaneously with admission of working fluid into the chamber of the torque converter 31, or vice versa.

However, when the vehicle is used for long-distance travel, the braking operation can be carried out in a different way, namely, by resorting to a brake pedal 7 in a manner similar to that of braking conventional vehicles including passenger cars. The brake pedal 7 is operatively connected with the valving element of a brake valve 70 having a port which is connected with the outlet of the source 9 and including a valve spring 70A tending to maintain the valving element in the illustrated position 0. The pedal 7 can move the valving element of the brake valve 70 from the position 0 to the position I or to the position II. The brake valve 70 can connect the source 9 with a first control line 71 or with a second control line 72. When the pedal 7 is not depressed, the spring 70A maintains the valving element of the brake valve 70 in the position 0 (as shown in FIG. 3). At such time, the valving element of the brake valve 70 seals the source 9 from the control lines 71 and 72. If the operator depresses the brake pedal 7 to the extent which is necessary to move the valving element of the brake valve 70 to the position I, the control line 72 remains sealed form the source 9 but the source 9 is connected with the control line 71. This entails the following:

1. The auxiliary regulating valve 59 is actuated so that its valving element is moved against the opposition of the spring 59A whereby the valve 59 interrupts the flow of compressed fluid from the source 9 to the forward speed selecting or changing valve 60. This initiates draining of the theretofore filled torque converter 41, torque converter 51 or clutch 61.

2. The twin check valve 36 receives compressed fluid at its right-hand inlet and admits compressed fluid into the control line 83 which causes the valving element of the main regulating valve 13 to move against the opposition of the spring 13A. Consequently, the filling conduit 73 communicates with the distributor conduit 20 and the chamber of the torque converter 31 receives pressurized working fluid. The same effect would be accomplished by manually shifting the handgrip member 40A of the selector valve 40 to the position R.

3. The twin check valve 67 receives compressed fluid from the pressure line 71 and admits compressed fluid into the pressure line 86. Consequently, the chamber of the clutch 61 receives pressurized working fluid from the distributor conduit 20 via filling conduit 76. The chamber of the clutch 61 receives fluid if it was not filled with such fluid prior to admission of compressed fluid into the control line 86. At any rate, the clutch 61 receives pressurized working fluid or remains filled with pressurized working fluid which results in transmission of torque from the output side to the input side of the transmission, namely by way of the clutch 61 and on to the primary shafts 33 and 43. With reference to FIG. 1, the power flow is from the output shaft 11 of the transmission through the medium of gears 30, 29, 25, 27 and 26 and through the secondary shaft 65 into the clutch 61. This ensures that the pump wheel 32 of the torque converter 31 is rotated at a speed which is necessary to furnish a hydrodynamic braking action.

The pressure in the control line 69 is zero as long as the brake valve 70 maintains its valving element in the position I. Consequently, the flow restrictor 16a maintains its movable component in the illustrated position under the action of the spring 16AA. This means that the flow restrictor 16a throttles the flow of working fluid from the distributor conduit 20 into the chamber of the clutch 61. The result is that the pump wheel 32 is driven at a medium speed and the hydrodynamic braking torque is maintained at a medium value. If the operator of the vehicle depresses the brake pedal 7 to the extent which is necessary to move the valving element of the brake valve 70 to the position II, the valve 70 connects the source 9 of compressed fluid with the control line 72. At the same time, the control line 71 continues to communicate with the source 9. The pressure in the control line 72 is communicated, by way of the twin check valve 68, to the control line 69 whereby the mobile component of the flow restrictor 16a moves in a direction to the left, as viewed in FIG. 3, and the throttling action of the flow restrictor 16a is reduced to zero. As already explained hereinabove, this results in more complete filling of the clutch 61 with working fluid. Consequently, the rotational speed of the pump wheel 32 in the torque converter 31 increases and the hydrodynamic braking torque is increased accordingly.

It is evident that the brake pedal 7 can be designed to shift the valving element of the brake valve 70 between more than three different positions. Furthermore, it is possible to replace the two-stage flow restrictor 16a with an infinitely variable flow restrictor so that the degree of filling of the chamber of the hydrodynamic clutch 61 can be varied between a large number or an infinite number of different values. As a result of such construction of the flow restrictor 16a, or as a result of the provision of a brake valve which allows its valving element to move between a large number of different positions, the braking torque which is furnished by the torque converter 31 can be varied, either continuously or between a large number of different values.

As shown in FIG. 3, the torque converters are provided with outlets for evacuation of working fluid. The same holds true for the clutch 61. The permanently open outlets of the torque converters 31, 41 and 51 are respectively shown at 93, 94 and 95. The permanently open outlet of the clutch 61 is shown at 96. The provision of such permanently open outlets is desirable and is especially important in connection with the hydrodynamic clutch 61. The permanently open outlet 96 cooperates with the flow restrictor 16a to allow for filling of the chamber of the clucth 61 to any desired degree by throttling the outflow and/or the inflow of working fluid.

An important advantage of the improved transmission is that the clutch 61 can be operated during prolonged braking while the vehicle advances in the preferred direction (e.g., while the vehicle travels downhill for an extended period of time). Thus, the braking action is carried out by the starting torque converter 31 together with the clutch 61 which performs a dual function, namely, the function of transmitting torque in the higher or highest speed range of the forward drive train which includes the starting torque converter 41 as well as the function of transmitting torque from the wheels of the vehicle (i.e., from the output shaft 11 of the transmission) to the input side of the transmission. It can be said that the clutch 61 then drives the prime mover PM whereby the braking action furnishes the energy which is needed to operate the torque converter 31 in the course of deceleration while the vehicle travels downhill. Another advantage of the just outlined dual function of the clutch 61 is that the fan of the cooling system (and, if necessary, also a cold water pump) can be driven at a sufficiently high speed without consumption of additional fuel.

Still another advantage of the clutch 61 is that its chamber can be filled to a desired extent (owing to the provision of the flow restrictor 16a). This renders it possible to change the speed ratio between the primary and secondary portions 62, 63 of the clutch. This clutch can be replaced with an adjustable friction clutch or with a variable-speed hydrostatic drive. Still further, it is possible to dispense with the flow restrictor 16a or with analogous means for varying the speed ratio between the primary and secondary portions of the clutch 61 or an analogous clutch if the extent to which the chamber of the braking torque converter is filled is or can be changed (reduced) and/or by changing (reducing) the pressure of working fluid in the braking torque converter.

In the embodiment of FIG. 4, all such parts which are identical with or clearly analogous to the corresponding parts of the transmission shown in FIGS. 1 to 3 are denoted by similar reference characters. The secondary shaft 45 of the starting torque converter 41 is a hollow shaft which drives the spur gear 24 and coaxially surrounds a central secondary shaft 45a receiving torque from the turbine wheel 54 of a second starting torque converter 51a. The starting torque converter 41 is operative in the lower speed range and can transmit torque to the output shaft 11 of the modified transmission through the medium of the gear train 24, 25, 29, 30. The second starting torque converter 51a is designed to transmit torque in the median speed range by way of the aforementioned secondary shaft 45a which drives the output shaft 11 through the medium of a spur gear 24a, gear 27, gear 25, gear 29 and gear 30. The number of teeth on the gears 24, 25 is different from the number of teeth on the gears 24a, 27. Furthermore, the numbers of these teeth are selected in such a way that the gear train 24, 25, 29, 30 exhibits a higher transmission ratio than the gear train 24a, 27, 25, 29, 30. This brings about a mechanical stepdown between the two starting torque converters 51a and 41. An advantage of such construction is that the transmission operates with a higher degree of efficiency within the entire median speed range owing to the provision of torque converter 51a which is not a cruising but rather a second starting torque converter. In other words, the torque converter 51a of FIG. 4 replaces the cruising torque converter 51 of FIG. 1. By proper selection of the transmission ratio, the gears 24 and 27 allow for an optimum mechanical stepdown between the speed ranges of the two starting torque converters 41 and 51a in dependency on the circumstances under which the vehicle is operated and also in dependency on the characteristics of the engine which transmits motion to the input shaft 10. The traction operation in the upper speed range by way of the clutch 61 takes place in the same way as in the transmission of FIG. 1, namely, by way of the primary shaft 33, secondary shaft 65 and gear 26 to the gear train 27, 25, 29, 30. The number of teeth on the gear 26 determines the mechanical stepdown for the upper speed range and the conformance to the characteristics of the engine.

The reference character 99 denotes a common transmission case for the torque converters 31, 41, 51a and the clutch 61.

FIG. 5 illustrates a further embodiment of the improved transmission. The clutch 61 is not coaxial with and is not adjacent to the torque converter 31 in the reverse drive train. Instead, the clutch 61 is coaxial with the second starting torque converter 51a which corresponds to the similarly referenced torque converter of FIG. 4. The clutch 61 is driven by the primary shaft 43 whose hollow extension 43a extends through the starting torque converter 51a. The extension 43a transmits torque to the primary half 62 of the clutch 61. The turbine wheel 54 of the torque converter 51a is connected with the hollow output shaft 55 which, in turn, is connected to the secondary half 63 of the clutch 61. The secondary shaft 65a of the clutch 61 simultaneously constitutes the secondary shaft of the second starting torque converter 51a and has an extension 45a which drives the gear 24a. The manner in which the gear 24a is operatively connected with the output shaft 11 is the same as in the transmission of FIG. 4. The secondary shaft 65 and gear 26 of FIG. 1 can be omitted in the transmission of FIG. 5.

An advantage of placing the clutch 61 into a position of coaxiality with the starting torque converters 41 and 51a of the forward drive train is that the interior of the transmission case 100 provides ample room for the three torque converters as well as for additional aggregates which must receive the same working fluid. Such aggregates include hydraulic pumps which drive cooling units as well as other hydraulically operated devices on the vehicle.

Contrary to the design of the torque converters, the clutch 61 comprises only rotary components which need not react against the transmission case 100 for the purpose of transmitting torque. In accordance with a feature of the invention, the transmission case 100 need not be designed as a twist-resistant body beyond the line of separation between the second starting torque converter 51a of the forward drive train and the clutch 61. Consequently, the clutch 61 can constitute a self-sustaining unit which can be secured to the exterior of the transmission case 100 in a manner as shown schematically in the lower left-hand portion of FIG. 5. To this end, the extension 43a of the primary shaft 43 as well as the secondary shaft 55 of the torque converter 51a and the common secondary shaft 65a are provided with separable or disengagable couplings (one indicated at 101). The reference character 170 denotes a housing or casing which encapsulates the clutch 61 (at least the rotary components of the clutch). This housing or casing 170 can be separably secured to the transmission case 100.

An advantage of placing of the clutch outside of the transmission case 100 is that the dimensions of the transmission case can be reduced accordingly. This contributes to the lower cost, lower weight and greater compactness of the main part of the transmission. Furthermore, such arrangement allows for more convenient access to the clutch 61 for the purposes of inspection, assembly and/or dismantling. The accessibility of the clutch is particularly important when the illustrated hydrodynamic clutch 61 is replaced wth a friction clutch, e.g., a disc clutch of any conventional design. Such friction clutches are subject to pronounced wear, whereas the wear upon a hydrodynamic clutch is practically nil.

The improved transmission can be used with great advantage in heavy-duty vehicles, e.g., in dump trucks. Furthermore, the transmission can be used with equal advantage in many other types of vehicles wherein traction is in the range of approximately 1500 KW.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A hydrodynamic reversing transmission, particularly for heavy-duty road vehicles, comprising a forward drive train including a first hydrodynamic starting torque converter; a reverse drive train including a second hydrodynamic starting torque converter, said torque converters being actuatable alternately to transmit torque in lower speed ranges of the respective drive trains; clutch means installed in one of said drive trains and operable to transmit torque in an upper speed range of the respective drive train; and brake means, including means for rendering said clutch means operative simultaneously with actuation of said second torque converter upon actuation of said brake means.

2. The transmission of claim 1, wherein one of said torque converters is actuatable in a counterbraking range and said clutch means comprises a hydrodynamic clutch.

3. The transmission of claim 1, wherein said one drive train is said forward drive train.

4. The transmission of claim 1, wherein said clutch means comprises rotary primary and secondary portions and said brake means further comprises means for varying the speed ratio of said portions.

5. The transmission of claim 1, wherein one of said drive trains further comprises an additional hydrodynamic torque converter actuatable to transmit torque in a median speed range of the respective drive train.

6. The transmission of claim 1, further comprising an additional hydrodynamic torque converter in said forward drive train, said one drive train constituting said forward drive train, said additional torque converter being actuatable to transmit torque in a higher speed range of said forward drive train, said additional torque converter being coaxial with said first torque converter, and said clutch means being coaxial with said second torque converter.

7. The transmission of claim 6, further comprising a common case for said torque converters and said clutch means.

8. The transmission of claim 6, wherein the common axis of said first and additional torque converters is parallel to the common axis of said second torque converter and said clutch means.

9. The transmission of claim 6, wherein said clutch means includes a centrally located secondary shaft and said second torque converter includes a hollow secondary shaft coaxially surrounding the secondary shaft of said clutch means.

10. The transmission of claim 1, further comprising a rotary output member and an additional hydrodynamic torque converter in said forward drive train, said additional torque converter being actuatable to transmit torque in a median speed range of the respective drive train, said first torque converter having a rotary secondary shaft and further comprising a gear train connecting said secondary shaft with said output member.

11. The transmission of claim 10, wherein said additional torque converter is a starting torque converter.

12. The transmission of claim 11, wherein said secondary shaft is hollow and said additional torque converter includes an additional secondary shaft coaxial with and extending through said hollow secondary shaft, and further comprising means for transmitting torque from the secondary shaft of said additional torque converter to said output member, the speed ratio of said torque transmitting means being lower than the speed ratio of said gear train.

13. The transmission of claim 1, further comprising an additional hydrodynamic torque converter in said forward drive train, said additional torque converter being actuatable to transmit torque in said upper speed range of the respective drive train and said clutch means being coaxial with said first and additional torque converters.

14. The transmission of claim 13, wherein the axis of said second torque converter is parallel to the common axis of said first and additional torque converters.

15. The transmission of claim 13, wherein said additional torque converter is disposed intermediate said first torque converter and said clutch means.

16. The transmission of claim 15, wherein said clutch means comprises a centrally located secondary shaft and said first and additional torque converters include a common hollow primary shaft coaxially surrounding said centrally located secondary shaft, said additional torque converter further having a hollow secondary shaft which coaxially surrounds said hollow primary shaft, said clutch means having a secondary portion connected with the secondary shaft of said additional torque converter.

17. The transmission of claim 1, further comprising a case for said torque converters and a discrete housing for said clutch means, said housing being separably secured to said case.

18. The transmission of claim 17, wherein said clutch means is coaxial with at least one of said torque converters and said clutch means and said one torque converter comprise coaxial shafts and further comprising means for separably coupling said coaxial shafts to each other.

19. The transmission of claim 1, further comprising a rotary input member and a rotary output member, said torque converters having rotary primary shafts operatively connected with and normally receiving rotary motion from said input member and rotary secondary shafts drivingly connected with said output member.

20. The transmission of claim 19, wherein the connections between said primary shafts and said input member comprise a first gear train and the connections between said secondary shafts and said output element comprise at least one second gear train.

* * * * *